(12) United States Patent
Hipolito

(10) Patent No.: US 12,468,350 B2
(45) Date of Patent: Nov. 11, 2025

(54) KEYBOARD COVER DEVICE

(71) Applicant: Miguel Hipolito, Shafter, CA (US)

(72) Inventor: Miguel Hipolito, Shafter, CA (US)

(*) Notice: Subject to any disclaimer, the term of this patent is extended or adjusted under 35 U.S.C. 154(b) by 156 days.

(21) Appl. No.: 18/386,186

(22) Filed: Nov. 1, 2023

(65) Prior Publication Data

US 2025/0138587 A1    May 1, 2025

(51) Int. Cl.
*G06F 1/16*    (2006.01)

(52) U.S. Cl.
CPC .................................. *G06F 1/1656* (2013.01)

(58) Field of Classification Search
CPC .... G06F 1/1603; G06F 1/1656; G06F 1/1669; G09B 13/00; G09B 13/04
See application file for complete search history.

(56) References Cited

U.S. PATENT DOCUMENTS

| | | | |
|---|---|---|---|
| 3,762,528 A | 10/1973 | Garman | |
| 3,971,140 A | 7/1976 | Martinez | |
| 4,294,557 A | 10/1981 | Blanchard | |
| 5,193,924 A * | 3/1993 | Larson | B41J 5/12 235/145 R |
| D342,944 S | 1/1994 | Rhodes | |
| 5,348,405 A * | 9/1994 | Lupkas | B41J 5/26 400/490 |
| 5,383,643 A * | 1/1995 | Koch | A47B 23/044 248/452 |
| 5,419,704 A * | 5/1995 | North | G09B 13/04 312/208.3 |
| 5,934,813 A | 8/1999 | Nyako | |
| 6,010,262 A * | 1/2000 | Linyear | A47B 21/0314 312/208.3 |
| 6,089,872 A * | 7/2000 | Mayhue | G09B 13/04 434/233 |
| 2007/0064970 A1* | 3/2007 | Yang | H04R 1/2803 381/388 |
| 2012/0013639 A1 | 1/2012 | Simons | |
| 2024/0064928 A1* | 2/2024 | Liu | G06F 1/1656 |
| 2025/0148701 A1* | 5/2025 | Xiong | G06T 7/55 |

FOREIGN PATENT DOCUMENTS

CA    2082578    5/1994

* cited by examiner

*Primary Examiner* — Anthony Q Edwards

(57) ABSTRACT

A keyboard cover device for hiding a keyboard from view while a user is learning to type a housing having a top wall and a peripheral wall being attached to and extending downwardly from the top wall. The peripheral wall has a bottom edge opposite the top wall defining an opening into an inner area. The housing covers an extrinsic computer keyboard positioned within the inner area. The peripheral wall has a cutout extending into the inner area with a height such that the cutout can receive a hand of the user, permitting the user to type while the housing is positioned over the extrinsic computer keyboard. The top wall is an opaque color to inhibit visibility of the extrinsic computer keyboard while the user is typing, facilitating the user in memorizing a position of a key on the extrinsic computer keyboard.

1 Claim, 10 Drawing Sheets

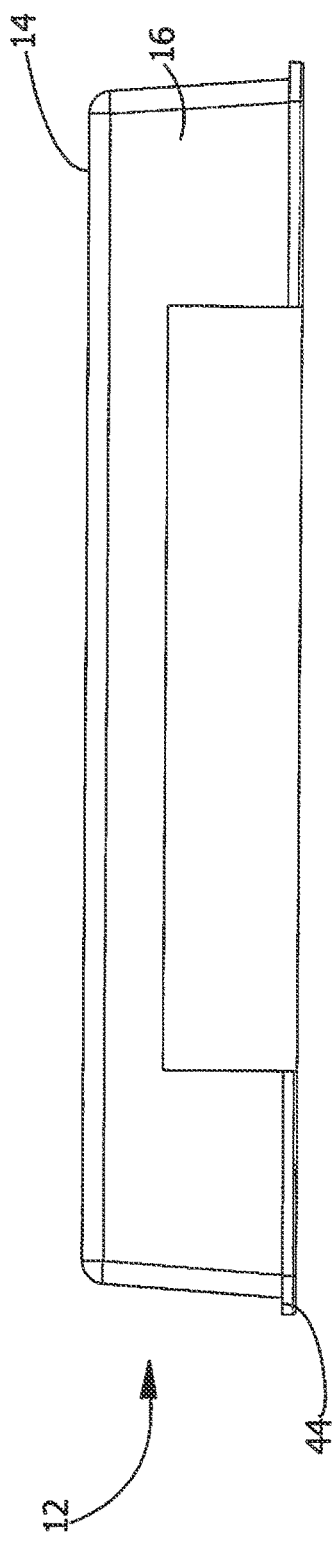
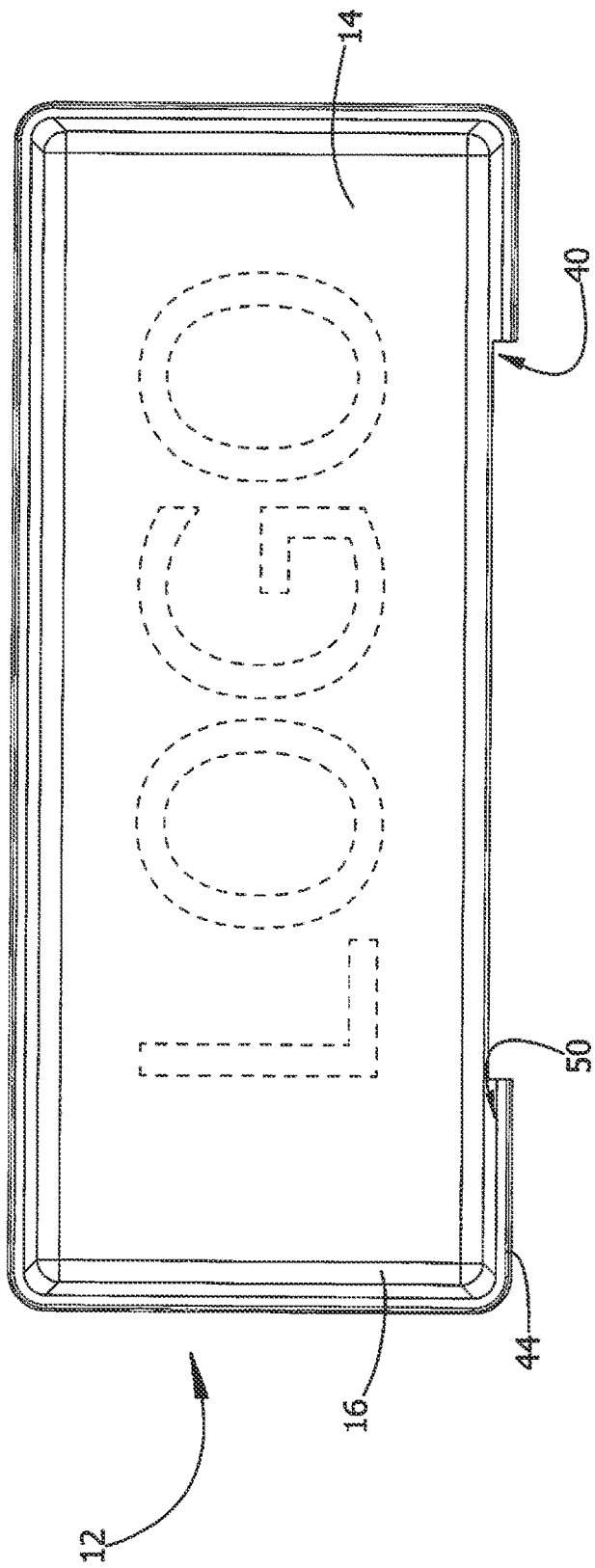

KEYBOARD COVER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to protective covers and more particularly pertains to a new protective cover for hiding a keyboard from view while a user is learning how to type.

(2) Description of Related Art Including Information Disclosed Under 37 CFR 1.97 and 1.98

The prior art relates to protective covers. Protective keyboard covers are typically designed to conform to the shape of the keys on the keyboard. Such protective covers may be positioned over the keys to cover the spaces between the keys or otherwise protect the keys from wear, tear, and damage while a user is typing. Some of these covers have brightly colored or illuminated indicia to increase the visibility of the keys on the keyboard. However, there is a need in the art for a cover that can be positioned over a keyboard to inhibit the view of the keys while the user is typing. Such covers would be helpful when a user is learning the position of the keys on the keyboard and practicing typing. These covers would be particularly useful when the user is being tested on their typing abilities because the user would be unable to view the keys while the user is typing and would instead need to rely on their memorization of the key positioning.

BRIEF SUMMARY OF THE INVENTION

An embodiment of the disclosure meets the needs presented above by generally comprising a housing having a top wall and a peripheral wall that is attached to and extending downwardly from the top wall. The peripheral wall has a bottom edge opposite the top wall defining an opening into an inner area bounded by the top wall and the peripheral wall. The housing is configured to cover an extrinsic computer keyboard positioned within the inner area. The housing may include an opaque color that is configured to inhibit visibility of the extrinsic computer keyboard positioned within the inner area. The peripheral wall has a cutout extending into the inner area. The cutout has a height relative to the extrinsic computer keyboard that is configured to receive a hand of a user thereby permitting the user to type on the extrinsic computer keyboard while the housing is positioned over the extrinsic computer keyboard. The top wall is the opaque color whereby the top wall is configured to inhibit visibility of the extrinsic computer keyboard while the user is typing on the extrinsic computer keyboard thereby facilitating the user in memorizing a position of a set of keys on the extrinsic computer keyboard.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a top view of an embodiment of the disclosure.

DETAILED DESCRIPTION OF THE INVENTION

Figure 1:
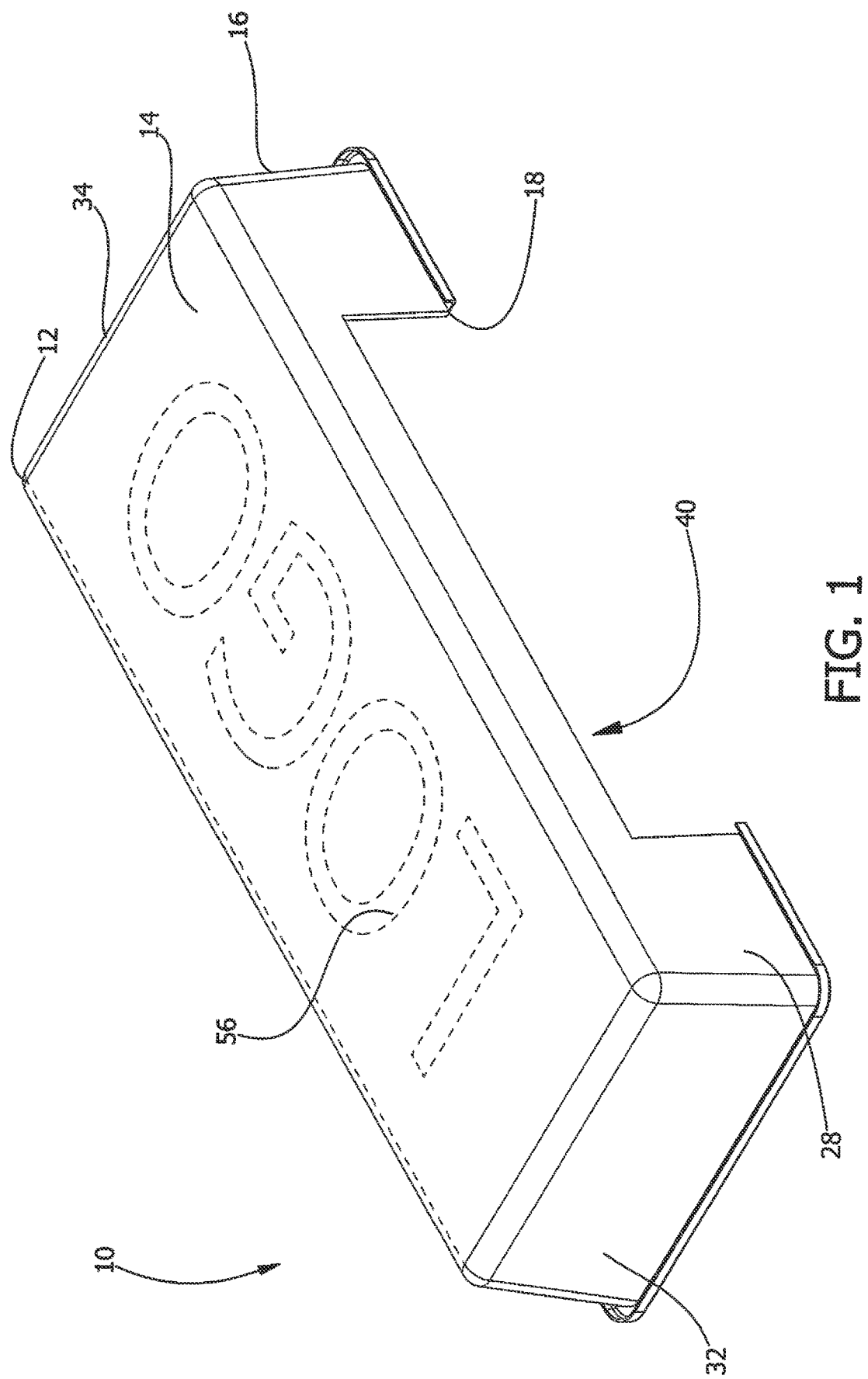
FIG. 1 is a top front isometric view of a keyboard cover device according to an embodiment of the disclosure.
Figure 2:
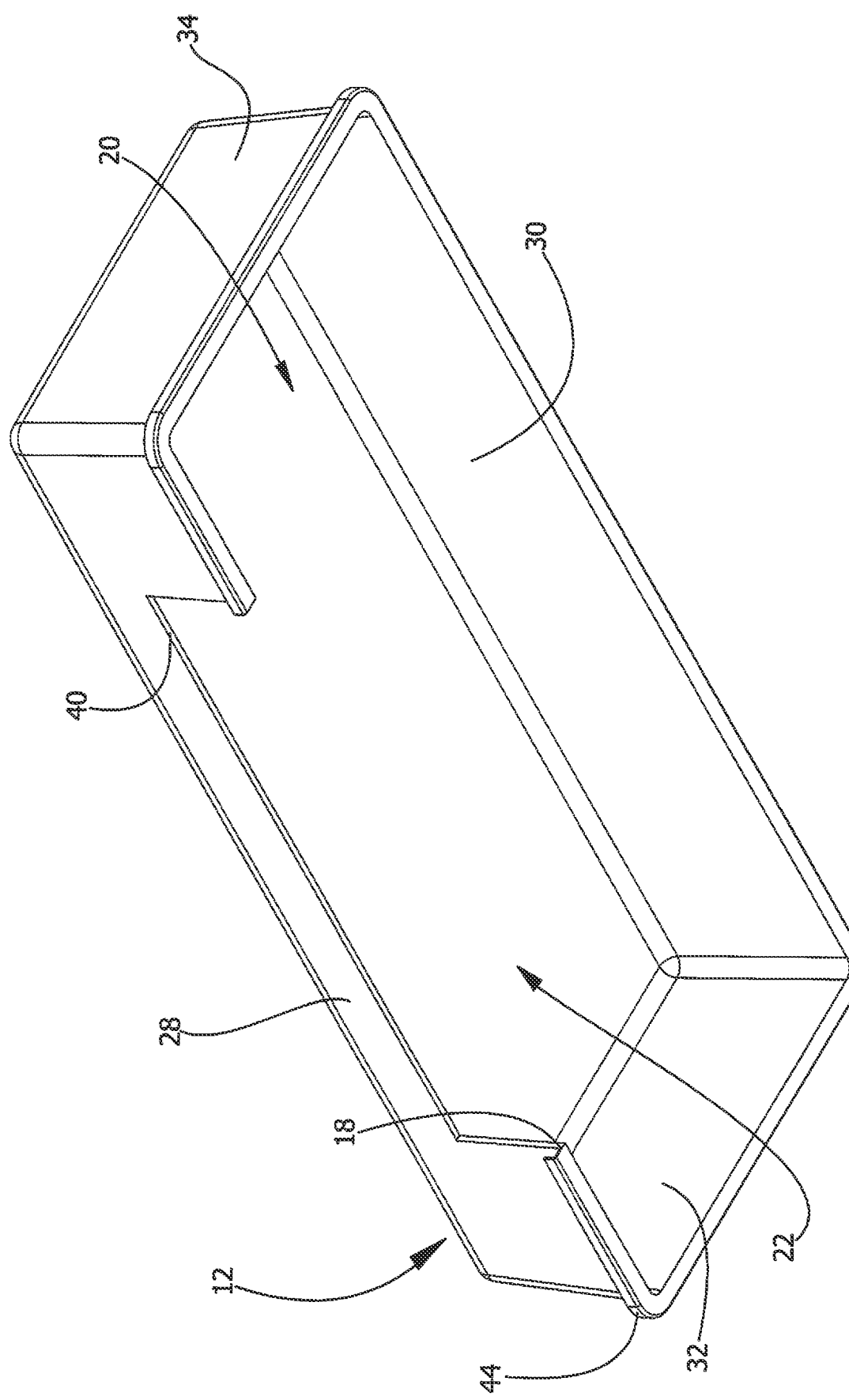
FIG. 2 is a bottom front isometric view of an embodiment of the disclosure.
Figure 5:
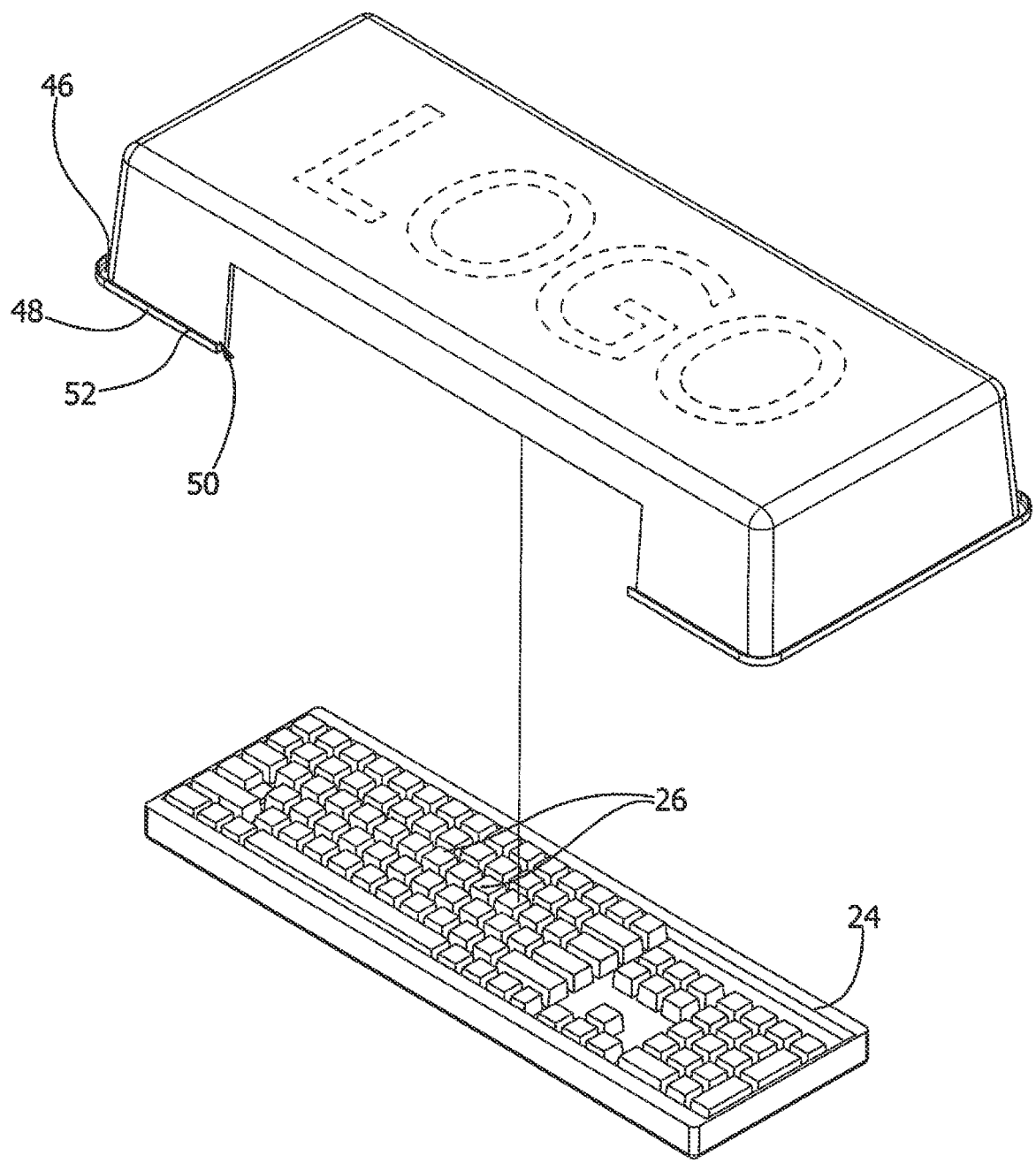
FIG. 5 is an exploded view of an embodiment of the disclosure.
Figure 6:
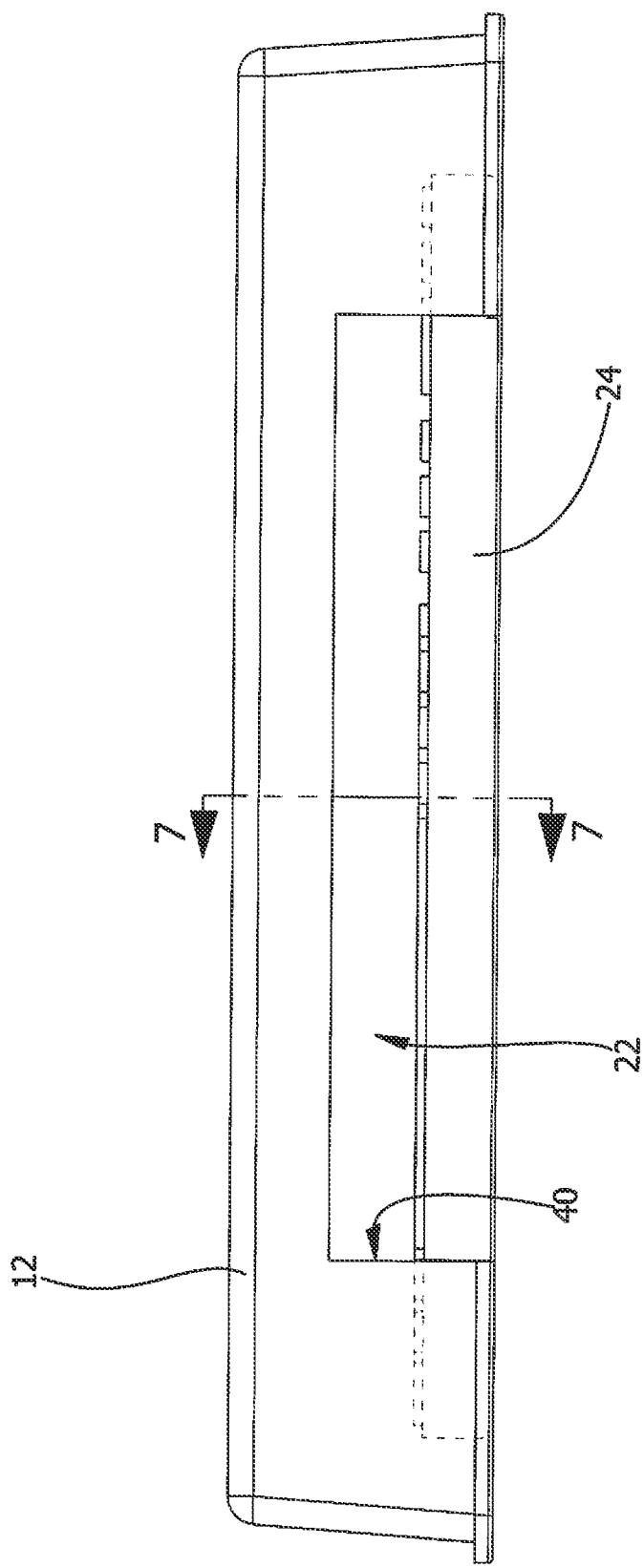
FIG. 6 is a front in-use view of an embodiment of the disclosure.
Figure 7:
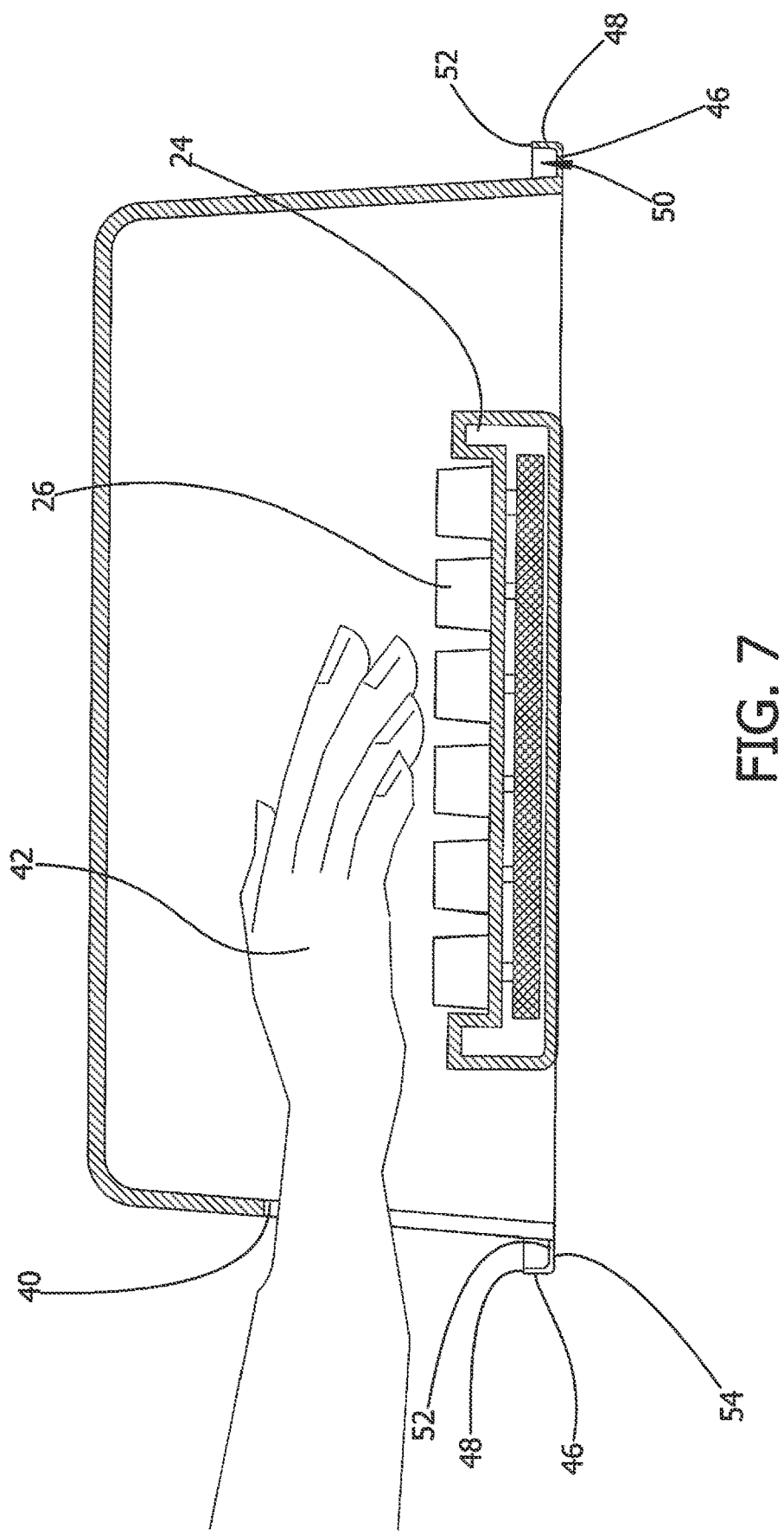
FIG. 7 is a cross-sectional view of an embodiment of the disclosure.
Figure 8:
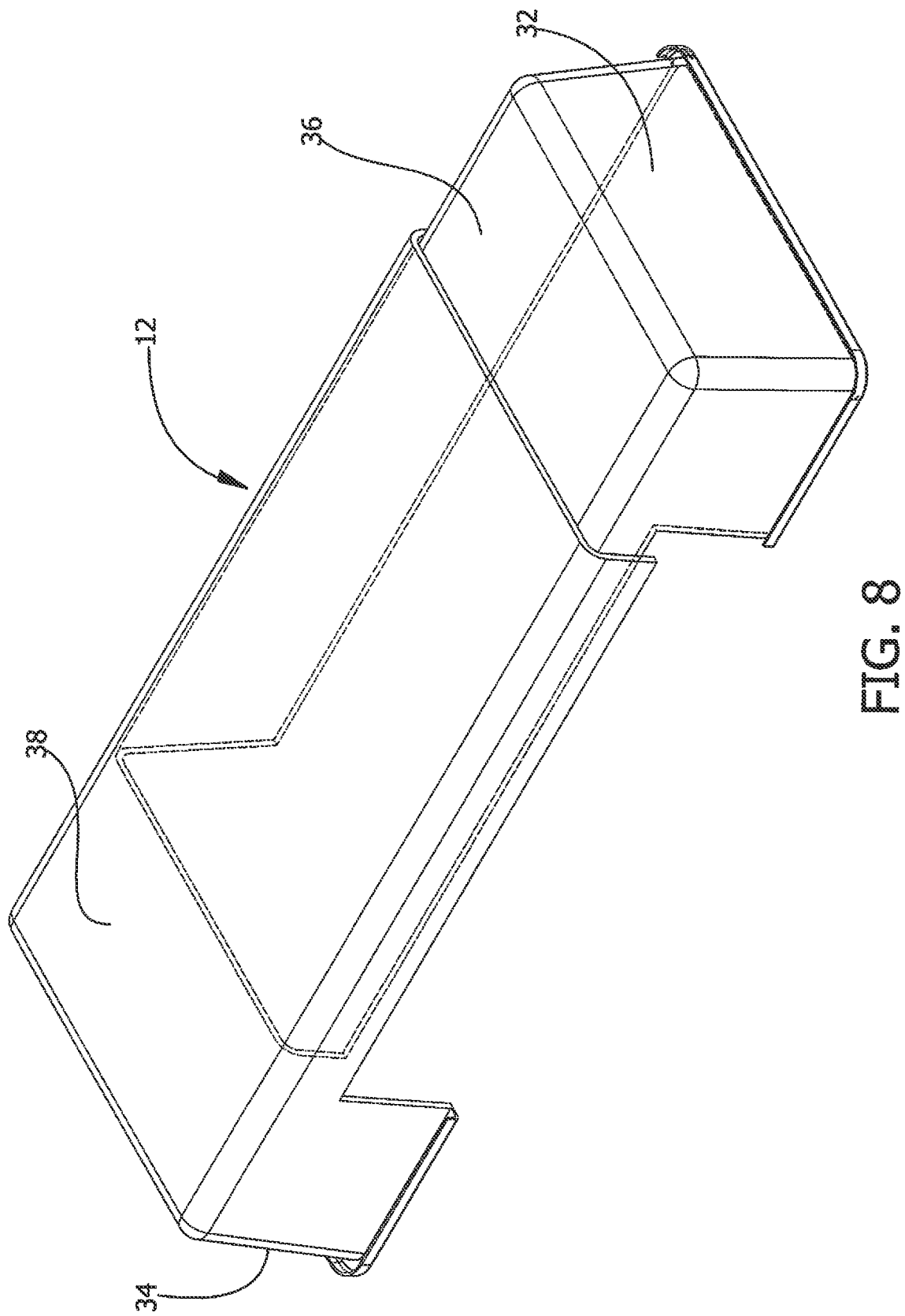
FIG. 8 is a top front isometric view of an embodiment of the disclosure.
Figure 9:
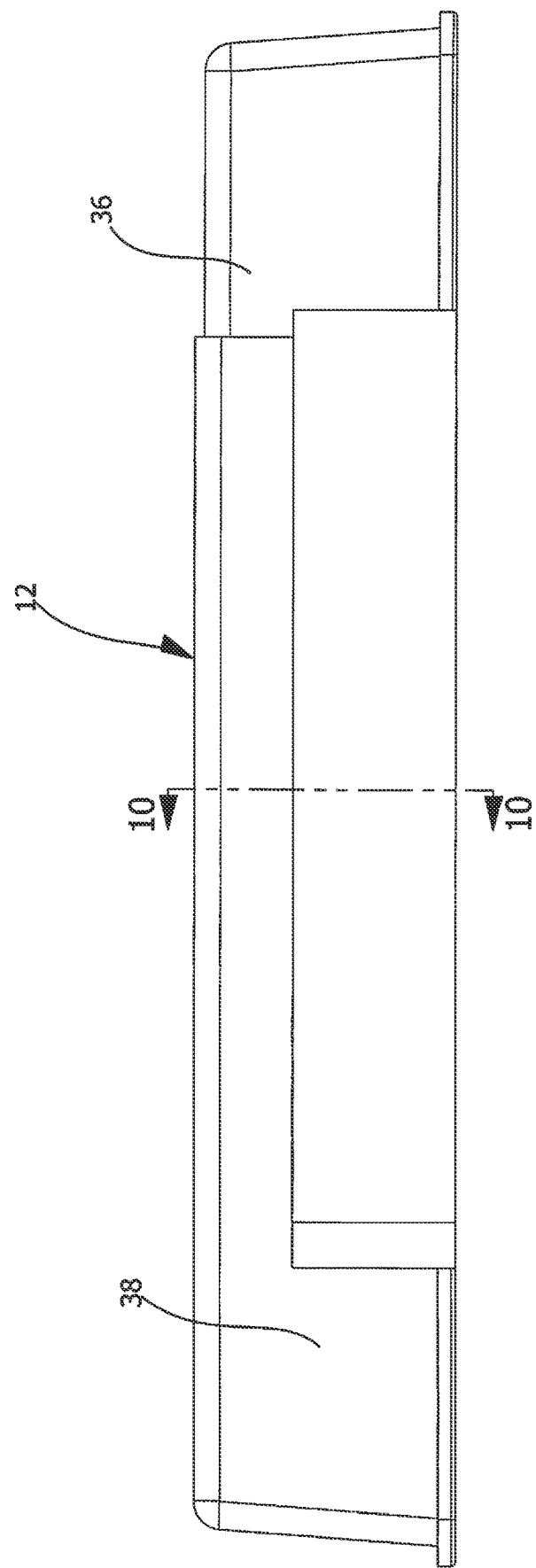
FIG. 9 is a front view of an embodiment of the disclosure.
Figure 10:
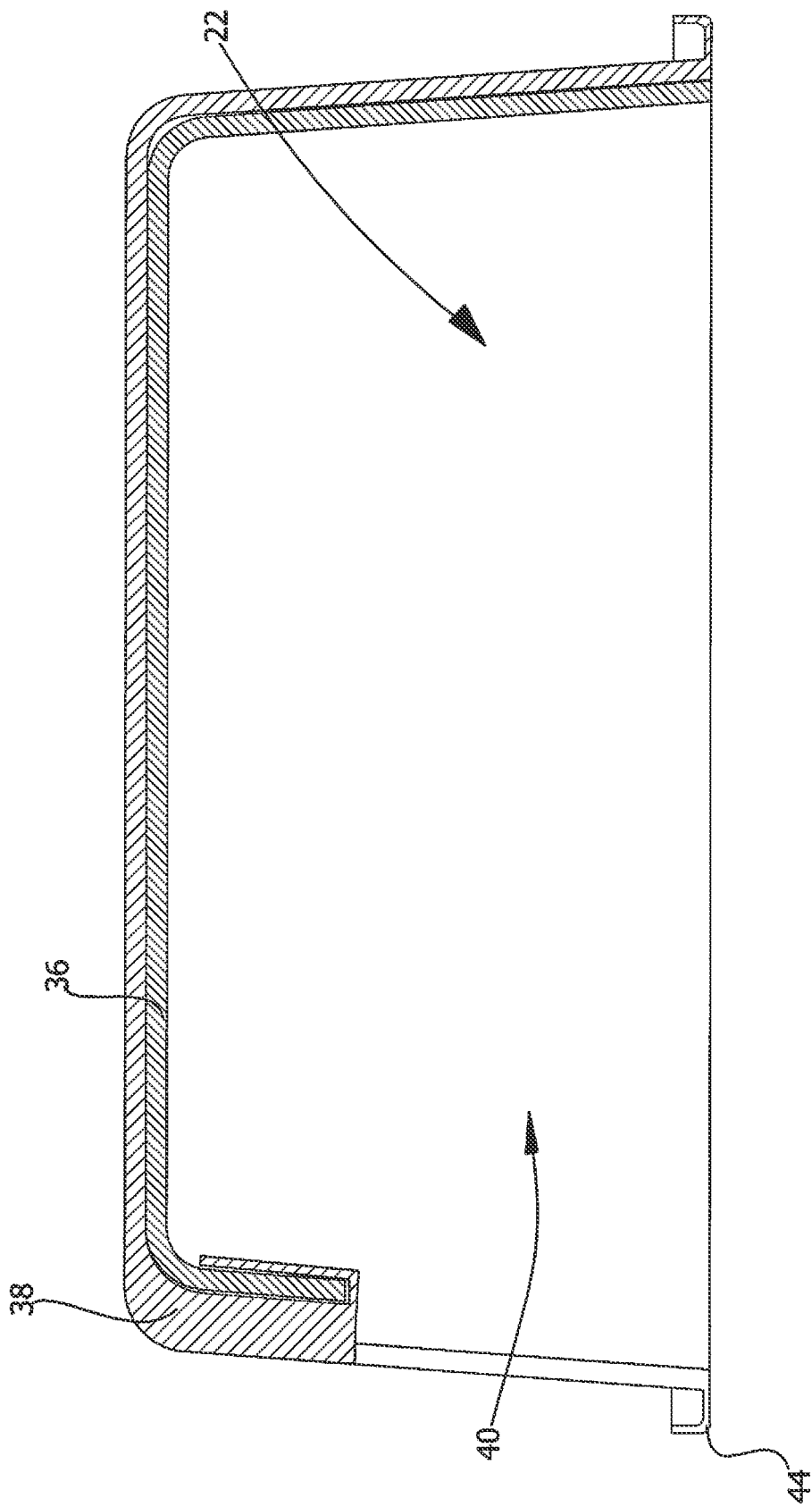
FIG. 10 is a cross-sectional view of an embodiment of the disclosure.

With reference now to the drawings, and in particular to FIGS. 1 through 11 thereof, a new protective cover embodying the principles and concepts of an embodiment of the disclosure and generally designated by the reference numeral 10 will be described.

As best illustrated in FIGS. 1 through 11, the keyboard cover device 10 generally comprises a housing 12 having a top wall 14 and a peripheral wall 16 that is attached to and extends downwardly from the top wall 14. The peripheral wall 16 has having a bottom edge 18 opposite the top wall 14 defining an opening 20 into an inner area 22 bounded by the top wall 14 and the peripheral wall 16. The housing 12 is configured to cover an extrinsic computer keyboard 24 positioned within the inner area 22. The housing 12 comprises an opaque color that is configured to inhibit visibility of the extrinsic computer keyboard 24 positioned within the inner area 22 whereby a position of a key 26 on the extrinsic computer keyboard 24 is not visible to a user when the housing 12 is positioned over the extrinsic computer keyboard 24. The peripheral wall may have a front side 28, a back side 30, a first lateral side 32, and a second lateral side 34. The housing 12 may have a length of at least 10.0 inches, a height of at least 2.5 inches, and a width of at least 5.0 inches, whereby the housing 12 is configured to accommodate the external computer keyboard 24 within the inner area 22.

In some embodiments, the housing 12 further includes a first section 36 that is telescopically coupled to a second section 38. The first section 36 is nested within the second section 38 such that the first section 36 is extendable relative to the second section 38. In other words, the first lateral side 32 is movably positionable relative to the second lateral side 34 thereby increasing the inner area 22. In such embodiments, the relative positioning of the first 36 and second 38 sections can be adjusted to accommodate different sizes of the extrinsic computer keyboard 24. For example, the first 36 and second 38 sections can be pulled apart to increase the inner area 22 and can be pushed together to decrease the inner area 22.

The peripheral wall 16 has a cutout 40 extending into the inner area 22 thereby providing access to the inner area 22. The cutout 40 has a height relative to the extrinsic computer keyboard 24 that is configured to receive a hand 42 of the user thereby permitting the user to type on the extrinsic computer keyboard 24 while the housing 12 is positioned over the extrinsic computer keyboard 24. For example, the cutout 40 may have a length of at least 8.0 inches and a height of at least 2.0 inches. The cutout 40 is generally positioned on the front side 28 of the peripheral wall 16.

The top wall 14 is generally the opaque color whereby the top wall 14 is configured to inhibit visibility of the extrinsic computer keyboard 24 while the user is typing on the extrinsic computer keyboard 24 thereby facilitating the user in memorizing the position of the key 26 on the extrinsic computer keyboard 24.

Figure 11:
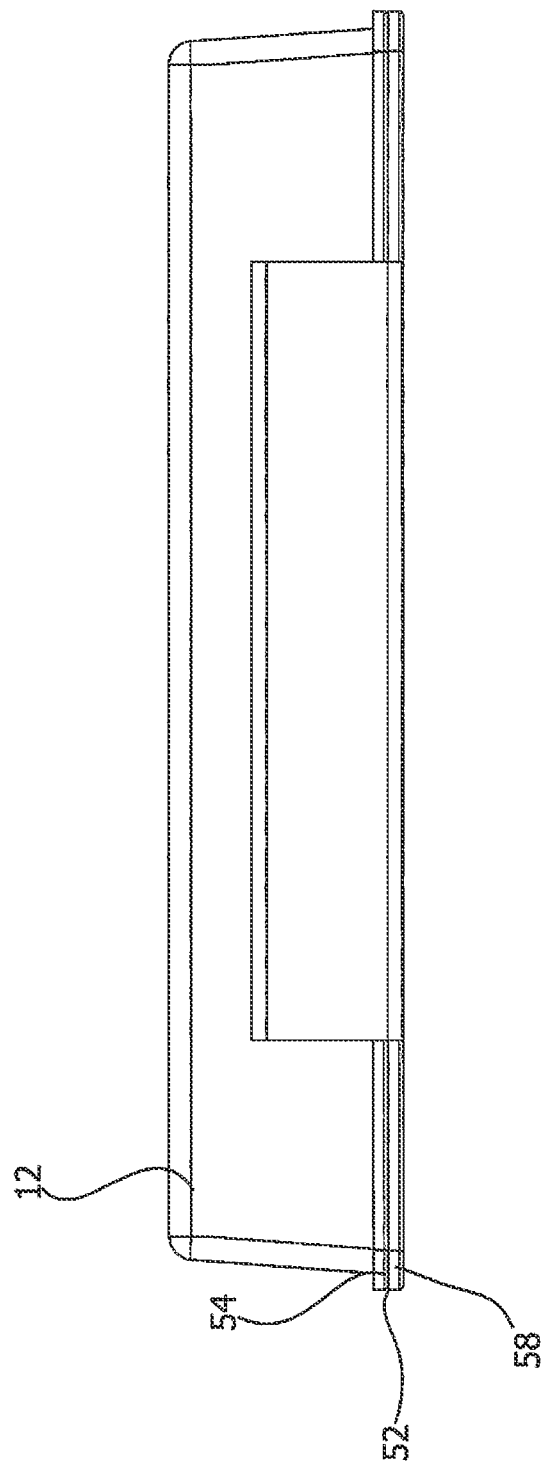
FIG. 11 is a front view of an embodiment of the disclosure.

A lip 44 may be coupled to the bottom edge 18. The lip 44 extends outwardly from the bottom edge 18 whereby the lip 44 is configured to facilitate the user in gripping the housing 12 when the housing 12 is stacked beneath a second housing 58, for example as shown in FIG. 11. The lip 44 may generally comprise a first panel 46 extending outwardly from the bottom edge 18. The first panel 46 may be perpendicular to the peripheral wall 16. A second panel 48 may be coupled to and extend upwardly from the first panel 46 thereby forming a channel 50 extending around an outer perimeter of the peripheral wall 16. The second panel 48 may be perpendicular to the first panel 46 wherein an upper edge 52 of the second panel 48 is configured to contact a lower edge 54 of the lip 44 on the second housing 58 when the second housing 58 is stacked on top of the housing 12.

The housing 12 may comprise any appropriate material. For example, the housing 12 may comprising a plastic material because those materials are typically lightweight, durable, and inexpensive to produce. Alternatively, the housing 12 may comprise wood or other natural or synthetic materials. The housing 12 may also include a decorative indicia 56, such as a logo, which is printed on the housing 12, as shown in FIG. 1. For example, the decorative indicia 56 may indicate a particular institution or program that is utilizing the keyboard cover device 10 to assist with typing instruction.

In use, the user can position the housing 12 over the extrinsic computer keyboard 24, for example during a test of the user's typing skills. Because the housing 12 is the opaque color, the user will be unable to view the extrinsic computer keyboard 24 within the inner area 22. The user can reach the extrinsic computer keyboard 24 through the cutout 40 and practice finding and typing with the key 26 relying on their memory and without being able to see the position of the key 26 though the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A keyboard cover assembly comprising:
a housing having a top wall and a peripheral wall being attached to and extending downwardly from the top wall, the peripheral wall having a bottom edge opposite the top wall defining an opening into an inner area bounded by the top wall and the peripheral wall, the housing being configured to cover an extrinsic computer keyboard being fully positioned within the inner area while the housing is positioned to rest on a surface supporting the extrinsic computer keyboard, the housing comprising an opaque color being configured to inhibit visibility of the extrinsic computer keyboard positioned within the inner area whereby a position of a key on the extrinsic computer keyboard is not visible to a user when the housing is positioned over the extrinsic computer keyboard, the peripheral wall having a front side, a back side, a first lateral side, and a second lateral side, the housing having a length of at least 10.0 inches, a height of at least 2.5 inches, and a width of at least 5.0 inches, the housing further comprising:
a first section being telescopically coupled to a second section, the first section being nested within the second section such that the first section is extendable relative to the second section whereby the first lateral side is movably positionable relative to the second lateral side thereby increasing the inner area;

the peripheral wall having a cutout extending into the inner area, the cutout providing access to the inner area, the cutout having a height relative to the extrinsic computer keyboard being configured to receive a hand of the user thereby permitting the user to type on the extrinsic computer keyboard while the housing is positioned over the extrinsic computer keyboard, the cutout being positioned on the front side, the cutout having a length of at least 8.0 inches and a height of at least 2.0 inches;

the top wall being the opaque color whereby the top wall is configured to inhibit visibility of the extrinsic computer keyboard while the user is typing on the extrinsic computer keyboard thereby facilitating the user in memorizing the position of the key on the extrinsic computer keyboard;

a lip being coupled to the bottom edge, the lip extending outwardly from the bottom edge whereby the lip is configured to facilitate the user in gripping the housing when the housing is stacked beneath a second housing, the lip comprising:
- a first panel extending outwardly from the bottom edge, the first panel being perpendicular to the peripheral wall;
- a second panel being coupled to and extending upwardly from the first panel thereby forming a channel extending around an outer perimeter of the peripheral wall;
- the second panel being perpendicular to the first panel wherein an upper edge of the second panel is configured to contact a lower edge of the lip on the second housing when the second housing is stacked on top of the housing;

the housing comprising a plastic material; and a decorative indicia being printed on the housing, the decorative indicia including a logo.

* * * * *